(12) United States Patent
Hu

(10) Patent No.: US 10,109,227 B2
(45) Date of Patent: Oct. 23, 2018

(54) APPARATUS FOR CONTROLLING BRIGHTNESS OF MOBILE PHONE SCREEN

(71) Applicant: Beijing Taitan Technology Co. Ltd., Beijing (CN)

(72) Inventor: Guohui Hu, Beijing (CN)

(73) Assignee: Wei Luo, Shenzhen, Guangdong Province (CN)

(*) Notice: Subject to any disclaimer, the term of this patent is extended or adjusted under 35 U.S.C. 154(b) by 34 days.

(21) Appl. No.: 15/396,406

(22) Filed: Dec. 30, 2016

(65) Prior Publication Data

US 2018/0182276 A1    Jun. 28, 2018

(30) Foreign Application Priority Data

Dec. 27, 2016 (CN) .......................... 2016 1 1224539

(51) Int. Cl.
*G09G 3/20* (2006.01)
*G09G 5/10* (2006.01)

(52) U.S. Cl.
CPC ......... *G09G 3/2003* (2013.01); *G09G 3/2092* (2013.01); *G09G 5/10* (2013.01); *G09G 2320/0626* (2013.01)

(58) Field of Classification Search
CPC ...... G09G 3/2003; G09G 3/2092; G09G 3/22; G09G 3/296; G09G 3/2965; G09G 3/34–3/3426; G09G 5/02; G09G 5/022; G09G 5/026; G09G 5/10; G09G 2320/0233; G09G 2320/0242; G09G 2320/06–2320/0653
See application file for complete search history.

(56) References Cited

U.S. PATENT DOCUMENTS

| | | | |
|---|---|---|---|
| 2011/0001766 A1* | 1/2011 | Hua | H05B 33/0815 345/690 |
| 2011/0057577 A1* | 3/2011 | Otake | H05B 33/0803 315/291 |
| 2015/0241891 A1* | 8/2015 | Lee | H05B 33/0815 315/127 |

* cited by examiner

*Primary Examiner* — Nathan Danielsen
(74) *Attorney, Agent, or Firm* — Cheng-Ju Chiang

(57) ABSTRACT

Embodiments of the present invention provide an apparatus for controlling brightness of a mobile phone screen, which includes: a mobile phone screen light source, a silicon-controlled dimmer, a rectifier processing module, a first constant current controller processing module, a second constant current controller processing module, an electrolytic capacitor processing module, and a third constant current controller processing module, since the first constant current controller processing module can be used to provide an anode forward current necessary to sustain conduction of the silicon-controlled dimmer, the problem of screen flickering in a switch changeover state can be avoided.

10 Claims, 2 Drawing Sheets

APPARATUS FOR CONTROLLING BRIGHTNESS OF MOBILE PHONE SCREEN

TECHNICAL FIELD

The present invention relates to the technical field of mobile phone screens, and more particularly, to an apparatus for controlling brightness of a mobile phone screen.

BACKGROUND

With the emergence of smart phones, the screen of a mobile phone has become the most important component in the mobile phone, generally, in different usage environments, it is necessary to adjust the brightness of a mobile phone screen according to the specific condition, for example, in a dark environment, it is necessary to increase the brightness of the screen of the mobile phone, or in the strong light, the brightness of the mobile phone is increased for ease of viewing, in the prior art, however, flicker may occur when adjusting and switching the screen brightness of the mobile phone, and this may be harmful to the user's health after long-term use, how to conveniently adjust the brightness of the mobile phone screen is a problem faced by the industry.

SUMMARY

In view of this, embodiments of the present invention provide an apparatus for controlling brightness of a mobile phone screen, which can solve some or all of the above problems, therefore, the problem of mobile phone screen flickering in a switch changeover state can be avoided, the circuit realized therefrom has a high power factor, is easy to adjust, simple in the circuit structure and low in the cost.

To solve the above technical problems, the present invention adopts the technical solutions as follows:

Embodiments of the present invention provide an apparatus for controlling brightness of a mobile phone screen, which includes:

a mobile phone screen light source, a rectifier processing module, a silicon-controlled dimmer, a first constant current controller, a second constant current controller, a third constant current controller, an electrolytic capacitor, a rectifier diode, a first sampling resistor, a second sampling resistor and a third sampling resistor;

the rectifier processing module is connected to an external power supply via the silicon-controlled dimmer, the positive phase output end of the rectifier processing module is connected to one end of the first constant current controller and the anode of the rectifier diode, the negative phase output end of the rectifier processing module is connected to other end of the first constant current controller and then grounded, the control terminal A of the first constant current controller is grounded via the first sampling resistor and the second sampling resistor, the first sampling resistor and the second sampling resistor are connected via point C, the cathode of the rectifier diode is connected to one end of the third constant current controller and the positive terminal of the first electrolytic capacitor, the other end of the third constant current controller is connected to the anode of the mobile phone screen light source, and meanwhile the control terminal D of the third constant current controller is connected to the anode of the mobile phone screen light source via the third resistor, the negative terminal of the first electrolytic capacitor is connected to the cathode of the mobile phone screen light source and one end of the second constant current controller, the other end of the second constant current controller is grounded, and meanwhile the control terminal B of the second constant current controller is grounded via the second sampling resistor;

when the voltage at point A of the first constant current controller control terminal is more than the voltage at point C, the first constant current controller is switched on, to provide an anode forward current necessary to sustain conduction of the silicon-controlled dimmer; when the rectified bus voltage is less than the conduction voltage drop of the light source, the electrolytic capacitor supplies power to the mobile phone screen light source.

Correspondingly, embodiments of the present invention provide an apparatus for controlling brightness of a mobile phone screen, which includes:

a mobile phone screen light source;

a silicon-controlled dimmer, configured to control the magnitude of an input current of an external power supply, so as to adjust the brightness of the mobile phone screen light source;

a rectifier processing module, configured to rectify an input external power supply by connecting the silicon-controlled dimmer and the external power supply;

a first constant current controller processing module, connected to the rectifier processing module, and configured to provide an anode forward current necessary to sustain conduction of the silicon-controlled dimmer;

a second constant current controller processing module, connected to the light source, and configured to provide constant current drive for the light source and an electrolytic capacitor processing module;

the electrolytic capacitor processing module with the electrolytic capacitor thereof being in parallel with the mobile phone screen light source, configured to supply power to the mobile phone screen light source when the input bus voltage is less than the conduction voltage drop of the mobile phone screen light source;

a third constant current controller processing module, being in series with the mobile phone screen light source and then in parallel with the electrolytic capacitor, configured to provide constant current drive for the mobile phone screen light source when supplying power to the mobile phone screen light source.

Embodiments of the present invention provide an apparatus for controlling brightness of a mobile phone screen, which includes a light source, configured to provide a light source for the mobile phone screen; a silicon-controlled dimmer, configured to control the magnitude of an input current of an external power supply, so as to adjust the brightness of the mobile phone screen light source; a rectifier processing module, configured to rectify an input external power supply by connecting the silicon-controlled dimmer and the external power supply; a first constant current controller processing module, connected to the rectifier processing module, and configured to provide an anode forward current necessary to sustain conduction of the silicon-controlled dimmer; a second constant current controller processing module, connected to the mobile phone screen light source, and configured to provide constant current drive for the mobile phone screen light source and an electrolytic capacitor processing module; the electrolytic capacitor processing module with the electrolytic capacitor thereof being in parallel with the mobile phone screen light source, configured to supply power to the mobile phone screen light source when the input bus voltage is less than the conduction voltage drop of the mobile phone screen light source; a third constant current controller processing module, being in series with the mobile phone screen light source and then in parallel with the electrolytic capacitor, configured to provide constant current drive for the mobile phone screen light source when supplying power to the mobile phone screen light source, since the first constant current controller processing module can be used to provide the anode forward current necessary to sustain conduction of the silicon-controlled dimmer, the silicon-controlled dimmer can start up quickly in the next period, and the problem of mobile phone screen flickering in a switch changeover state can be avoided, what's more, since the silicon-controlled dimmer is switched on quickly, the active power of the circuit can be improved, that is, the circuit realized therefrom has a high power factor, so it is easy to adjust, simple in the circuit structure, and low in the cost.

Additionally, the electrolytic capacitor of an electrolytic capacitor processing module is used to eliminate a stroboscopic component of the mobile phone screen, the stroboscopic phenomenon can be avoided, the range of an operating input voltage can be widened, so that the mobile phone screen light source can continue to maintain an operating state when the rectified bus voltage is less than the conduction voltage drop of the mobile phone screen light source, and when electrolytic capacitor processing module supplies power to the mobile phone screen light source, the third constant current controller processing module can make the current for supplying power to the mobile phone screen light source by the electrolytic capacitor maintain constant, further increasing the light-efficiency intensity.

BRIEF DESCRIPTION OF DRAWINGS

In order to illustrate the technical solutions in embodiments of the present invention or the prior art more clearly, accompanying drawings needed in the embodiments or the prior art are illustrated briefly as follows. Apparently, the accompanying drawings are merely certain of embodiments recorded in the present invention, and persons skilled in the art can derive other drawings from them.

DETAILED DESCRIPTION

The technical solutions in the embodiments of the present invention are hereinafter described clearly and completely with reference to the accompanying drawings in the embodiments of the present invention.

Figure 1:
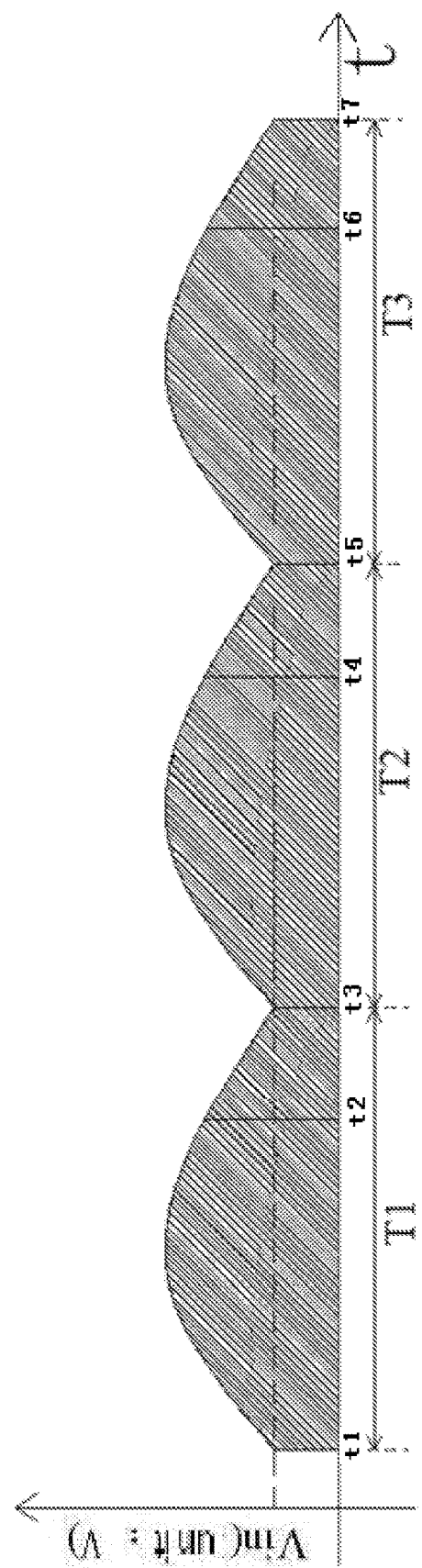
FIG. 1 is a bus voltage waveform diagram of an apparatus for controlling brightness of a mobile phone screen with an electrolytic capacitor after rectification according to the present invention.

Refer to FIG. 1, which is a bus voltage waveform diagram of an apparatus for controlling brightness of a mobile phone screen with an electrolytic capacitor after rectification according to the present invention.

As shown, the rectified bus voltage waveform in this embodiment is a non-sinusoidal wave, in particular, the silicon-controlled dimmer in this embodiment is switched on at time t1, and switched off at time t2, while the silicon-controlled dimmer is again switched on at time t3 of another period, such a cycle is repeated, particularly, within an interval range of t2 and t3, an electrolytic capacitor can be used to supply power to the mobile phone screen light source (such as an LED light source), that is, within an interval range of t2 and t3, the mobile phone screen light source (such as an LED light source) can maintain to be turned on, which will not repeated herein.

Figure 2:
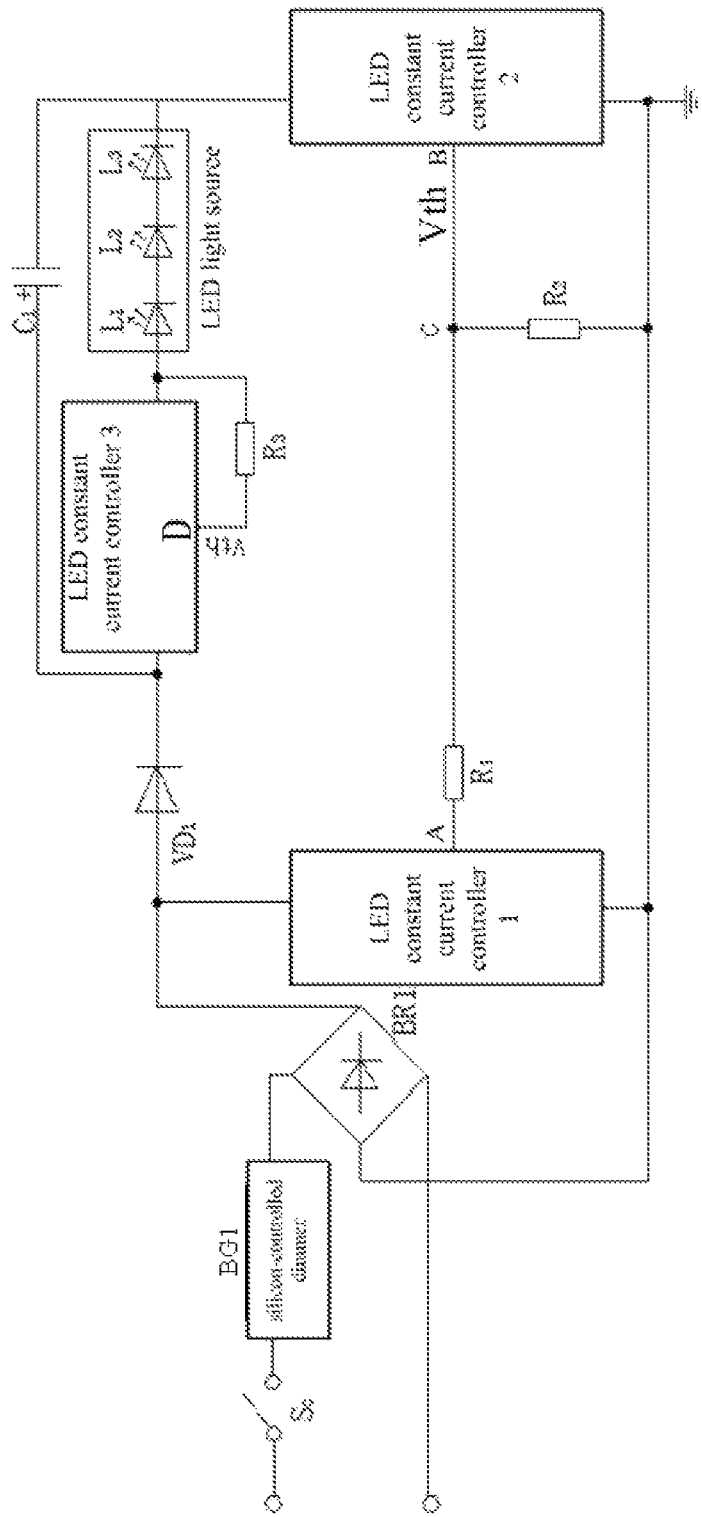
FIG. 2 is a structural schematic diagram of a circuit for an apparatus for controlling brightness of a mobile phone screen according to a specific embodiment of the present invention.

Refer to FIG. 2, which is a structural schematic diagram of a circuit for an apparatus for controlling brightness of a mobile phone screen according to a specific embodiment of the present invention.

This embodiment is applicable to a linear single-segment no-stroboflash dimming application mode, in practical implementation, the silicon-controlled dimmer is used to control the brightness of the mobile phone screen light source in this embodiment, as a specific embodiment, the rectifier processing module can adopt a bridge rectifier BR1, additionally, for ease of input power source control, a power switch also can be included, in particular, take an LED light source for the mobile phone screen background light source as an example in this embodiment, the apparatus for controlling brightness of a mobile phone screen in this embodiment mainly includes:

a power switch S0, a silicon-controlled dimmer BG1, a bridge rectifier BR1, a rectifier diode VD1, an electrolytic capacitor C1, three LED constant current controllers: LED constant current controller 1 (i.e., a first LED constant current controller), LED constant current controller 2 (i.e., a second LED constant current controller), and LED constant current controller 3 (i.e., a third LED constant current controller); sampling resistors R1, R2, R3 (i.e., a first resistor, a second resistor and a third sampling resistor), an LED light source (in practice, the LED light source includes at least one LED lamp bead, as an example, in this embodiment, the LED light source is a light string that includes three LED lamp beads or in practice other numbers of LED lamp beads, which is not limited herein), and the specific connection relations of each element in the circuit are as follows:

the bridge rectifier BR1 is connected to the external power supply via the power switch S0 and the silicon-controlled dimmer BG1, the positive phase output end of the bridge rectifier BR1 is connected to one end of the LED constant current driver 1 and the anode of the rectifier diode VD1, the negative phase output end of the bridge rectifier BR1 is connected to other end of the LED constant current driver 1 and then grounded, the control terminal A of the LED constant current driver 1 is grounded via the resistors R1 and R2; the cathode of the rectifier diode VD1 is connected to one end of the LED constant current driver 3, and meanwhile, the cathode of the rectifier diode VD1 is connected to the positive terminal of the electrolytic capacitor C1; the control terminal D of the LED constant current controller 3 is connected to the other end of the LED constant current controller 3, and meanwhile, the other end of the LED constant current controller 3 is connected to the anode of the LED light source, the cathode of the LED light source is connected to the negative terminal of the electrolytic capacitor C1, and meanwhile the cathode of the LED light source is connected to one end of the LED constant current controller 2, terminal B of the LED constant current driver 2 is grounded via the resistor R2, and meanwhile the other end of the LED constant current driver 2 is also grounded.

Hereinafter, the working process of the LED lamp dimming control circuit in this embodiment will be described in detail:

When the power switch is closed, within T1 period, the silicon-controlled dimmer BG1 is adjusted at time t1 to trigger to be switched on, and meanwhile the electrolytic capacitor C1 is charged via a bus, when the bus voltage Vin>$V_{LED\ light\ source}$ (i.e., the bus voltage is greater than the conduction voltage drop of the LED light source), the LED light source is ON, during this time, the electrolytic capacitor C1 is continuously charged, then the LED constant current controller 1 detects the voltage at point A, when the voltage at point A is less than the voltage at point C, the LED constant current controller 1 is switched off, the LED constant current controllers 2 and 3 drive the LED light source, and control the current of the LED light source, then the current flowing through the LED light source is $I_{LED\ light\ source}$=Vth/R3, the current flowing through the LED light source and the electrolytic capacitor C1 is $I_{LED\ light\ source}$=Vth/R2; when the bus voltage Vin<$V_{LED\ light\ source}$ (i.e., the bus voltage is less than the conduction voltage drop of the LED light source), the electrolytic capacitor C1 supplies power to the LED light source, the LED constant current driver 3 drives the LED light source and provides the current required by the LED light source, and the current is: $I_{LED\ light\ source}$=Vth/R3 (in this embodiment, R2<R3), the electrolytic capacitor C1 continuously supplies power to the LED light source until the bus voltage Vin>$V_{LED\ light\ source}$ in the next period;

Additionally, within T1 period, the LED constant current controller 1 detects the voltage at point A, when the voltage at point A is more than the voltage at point C, the LED constant current controller 1 is switched on, and the LED constant current controller 2 is switched off, at time t2, the silicon-controlled dimmer BG1 is triggered to be switched off, the LED constant current controller 1 provides an anode forward current necessary to sustain conduction of the silicon-controlled dimmer BG1; within T2 period, the silicon-controlled dimmer BG1 is again triggered to be switched on at time t3, the electrolytic capacitor C1 is charged via a bus, and meanwhile, the LED constant current controller 1 detects the voltage at point A, when the voltage at point A is less than the voltage at point C, the LED constant current controller 1 is switched off, when the bus voltage Vin>$V_{LED\ light\ source}$ (i.e., the bus voltage is greater than the conduction voltage drop of the LED light source), the LED light source is ON, then the LED light source is powered by the power supply, the above control process is repeated subsequently, and thus is not repeated herein.

To sum up, the apparatus for controlling brightness of a mobile phone screen in this embodiment provides an anode forward current necessary to sustain conduction of the silicon-controlled dimmer through the LED constant current controller 1; so that the silicon-controlled dimmer can start up quickly in the next period, and the problem of the mobile phone screen light source (i.e., LED lamp) flickering in a switch changeover state can be avoided, what's more, since the silicon-controlled dimmer is switched on quickly, the active power of the circuit can be improved, that is, the circuit realized therefrom has a high power factor value, so it is easy to adjust, simple in the circuit structure, and low in the cost; additionally, the electrolytic capacitor is used to eliminate a stroboscopic component of the mobile phone screen light source, the stroboscopic phenomenon can be avoided, the range of an operating input voltage can be widened, so that the mobile phone screen light source (i.e., the LED light source) can continue to maintain an operating state when the rectified bus voltage is less than the conduction voltage drop of the mobile phone screen light source (i.e., the LED light source), and when electrolytic capacitor C1 supplies power to the mobile phone screen light source (i.e., the LED light source), the constant current controller 3 can prolong the time of the electrolytic capacitor for supplying power to mobile phone screen light source (i.e., the LED light source), further increasing the light-efficiency intensity.

What is claimed is:

1. An apparatus for controlling brightness of a mobile phone screen, comprising:
    a mobile phone screen display processing unit; and
    a mobile phone screen brightness control unit connected to the mobile phone screen display processing unit;
    wherein the mobile phone screen brightness control unit particularly comprises:
        a mobile phone screen light source including at least one light emitting diode;
        a rectifier processing module including a positive phase output end and a negative phase output end;
        a silicon-controlled dimmer;
        a first constant current controller including a first end, a second end, and a first control terminal (A);
        a second constant current controller including a first end, a second end, and a second control terminal (B);
        a third constant current controller including a first end, a second end, and a third control terminal (D);
        an electrolytic capacitor;
        a rectifier diode;
        a first sampling resistor;
        a second sampling resistor; and
        a third sampling resistor;
        the rectifier processing module is connected to an external power supply via the silicon-controlled dimmer;
        the positive phase output end of the rectifier processing module is connected to the first end of the first constant current controller and the anode of the rectifier diode;
        the negative phase output end of the rectifier processing module is connected to the second end of the first constant current controller and is grounded;
        the first control terminal (A) of the first constant current controller is grounded via the first sampling resistor and the second sampling resistor;
        the first sampling resistor and the second sampling resistor are connected via a point (C), the cathode of the rectifier diode is connected to the first end of the third constant current controller and the positive terminal of the electrolytic capacitor;
        the second end of the third constant current controller is connected to the anode of the mobile phone screen light source; and
        the third control terminal (D) of the third constant current controller is connected to the anode of the mobile phone screen light source via the third resistor;
        the negative terminal of the electrolytic capacitor is connected to the cathode of the mobile phone screen light source and the first end of the second constant current controller;
        the second end of the second constant current controller is grounded, and the second control terminal (B) of the second constant current controller is grounded via the second sampling resistor;
        when the voltage at the first control terminal (A) of the first constant current controller is more than the voltage at point (C), the first constant current controller is switched on to provide an anode forward current necessary to sustain conduction of the silicon-controlled dimmer; and
        when the voltage at the cathode of the rectifier diode is less than the conduction voltage drop of the mobile phone screen light source, the electrolytic capacitor supplies power to the mobile phone screen light source.

2. The apparatus according to claim 1, wherein, the rectifier processing module is a bridge rectifier.

3. The apparatus according to claim 1, further comprising an input control switch connected to the external power supply.

4. An apparatus for controlling brightness of a mobile phone screen, comprising:
   a mobile phone screen display processing unit; and
   a mobile phone screen brightness control unit connected to the mobile phone screen display processing unit;
   wherein the mobile phone screen brightness control unit particularly comprises:
   a mobile phone screen light source including at least one light emitting diode;
   a silicon-controlled dimmer, configured to control the magnitude of an input current of an external power supply, so as to adjust the brightness of the at least one light emitting diode;
   a rectifier processing module, connected to the silicon-controlled dimmer and configured to rectify an input voltage from the external power supply;
   a first constant current controller processing module, connected to the rectifier processing module, and configured to provide an anode forward current necessary to sustain conduction of the silicon-controlled dimmer;
   a second constant current controller processing module, connected to the mobile phone screen light source, and configured to provide constant drive current for the mobile phone screen light source and an electrolytic capacitor processing module;
   wherein, the electrolytic capacitor processing module with an electrolytic capacitor thereof being in parallel with the mobile phone screen light source, is configured to supply power to the mobile phone screen light source when the input voltage is less than the conduction voltage drop of the mobile phone screen light source;
   a third constant current controller processing module, being in series with the mobile phone screen light source, and the third constant current controller processing module with the mobile phone screen light source being in parallel with the electrolytic capacitor, configured to provide the constant drive current for the mobile phone screen light source when supplying power to the mobile phone screen light source.

5. The apparatus according to claim 4, wherein, the electrolytic capacitor processing module particularly comprises the electrolytic capacitor and a rectifier diode;
   the rectifier processing module including a positive phase output end and a negative phase output end;
   the anode of the rectifier diode is connected to the positive phase output end of the rectifier processing module, the cathode of the rectifier diode is connected to the positive terminal of the electrolytic capacitor, and the cathode of the rectifier diode is also connected to the third constant current controller processing module.

6. The apparatus according to claim 5, wherein, the first constant current controller processing module particularly comprises a first constant current controller and a first sampling resistor; the first constant current controller includes a first end, a second end, and a first control terminal (A);
   the second constant current controller processing module particularly comprises a second constant current controller and a second sampling resistor; the second constant current controller includes a first end, a second end, and a second control terminal (B);
   the first end of the first constant current controller is connected to the positive phase output end of the rectifier processing module, and the second end of the first constant current controller is grounded, and the first control terminal (A) of the first constant current controller is grounded via the first sampling resistor and the second sampling resistor;
   the first sampling resistor and the second sampling resistor are connected via a point (C); the first end of the second constant current controller is connected to the cathode of the mobile phone screen light source and the negative terminal of the electrolytic capacitor; the second end of the second constant current controller is grounded; and the second control terminal (B) of the second constant current controller is grounded via the second sample resistor.

7. The apparatus according to claim 5, wherein, the third constant current controller processing module particularly comprises a third constant current controller and a third sampling resistor; the third constant current controller includes a first end, a second end, and a third control terminal (D);
   the first end of the third constant current controller is connected to the cathode of the rectifier diode; the second end of the third constant current controller is connected to the anode of the mobile phone screen light source; and the third control terminal (D) of the third constant current controller is connected to the anode of the mobile phone screen light source via the third sampling resistor.

8. The apparatus according to claim 7, wherein, the resistance value of the second sampling resistor is less than that of the third sampling resistor.

9. The apparatus according to claim 4, wherein, the rectifier processing module is a bridge rectifier.

10. The apparatus according to claim 4, further comprising an input control switch connected to the external power supply.

* * * * *